June 24, 1941.                C. G. FLYGARE                2,247,228
                              GRINDING MACHINE
                           Filed Oct. 2, 1939          3 Sheets-Sheet 1

Inventor
CARL G. FLYGARE
By Harold W. Eaton
        Attorney

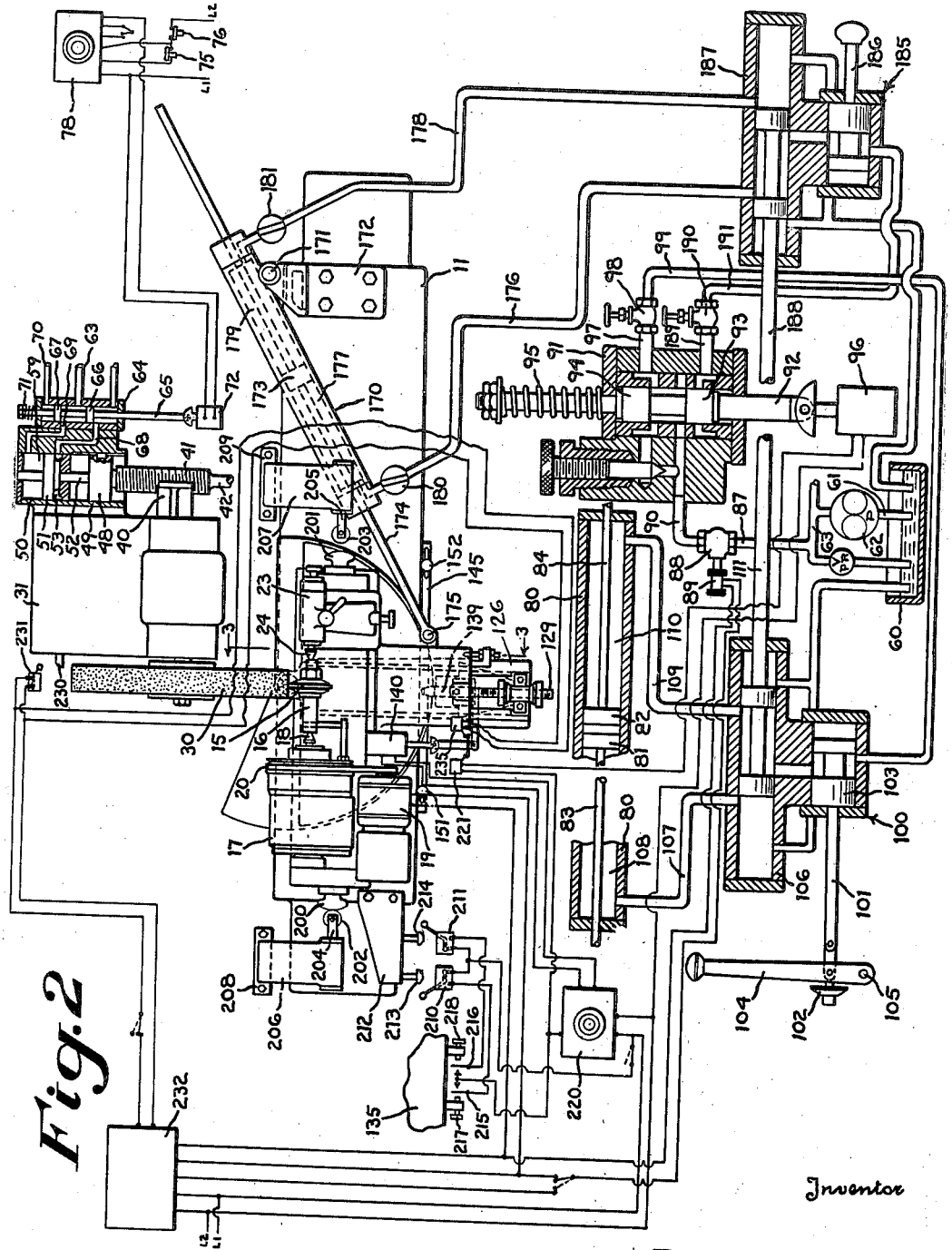

June 24, 1941.   C. G. FLYGARE   2,247,228
GRINDING MACHINE
Filed Oct. 2, 1939   3 Sheets-Sheet 3

Inventor
CARL G. FLYGARE
By Harold W. Eaton
Attorney

Patented June 24, 1941

2,247,228

UNITED STATES PATENT OFFICE 2,247,228

GRINDING MACHINE

Carl G. Flygare, Worcester, Mass., assignor to Norton Company, Worcester, Mass., a corporation of Massachusetts Application October 2, 1939, Serial No. 297,513

15 Claims. (Cl. 51—94)

The invention relates to grinding machines, and more particularly to a cylindrical type grinding machine for automatically grinding a cylindrical face and a fillet or radius adjacent thereto on a work piece, such as a piston ring.

One object of the invention is to provide a simple and thoroughly practical grinding machine for automatically grinding a cylindrical type work piece having a fillet or radius formed adjacent to one or both ends thereof. Another object of the invention is to provide a grinding machine for grinding a true cylindrical surface on a work piece and then swinging the work piece to grind a fillet thereon adjoining said cylindrical surface. A further object of the invention is to provide such a grinding machine which is arranged to grind a cylindrical work piece and then to form a radius or fillet adjoining each end of the cylindrical face.

Another object of the invention is to grind a cylindrical face on a work piece while the axis of the work piece is maintained substantially parallel to the axis of the grinding wheel and then to swing the axis of the work piece to produce a fillet or radius adjoining the end of said cylindrical face. A further object of the invention is to provide apparatus for grinding a cylindrical face on a work piece while maintaining the axis of the work piece substantially parallel to the axis of the grinding wheel and then to swing the axis of the work piece to produce a radius or fillet adjacent to and adjoining said cylindrical face and then to shift the work piece in an axial direction and again to swing the axis thereof to produce a fillet or radius adjacent to and adjoining the other end of said cylindrical face. Other objects will be in part obvious or in part pointed out hereinafter.

The invention accordingly consists in the features of construction, combinations of elements, and arrangements of parts, as will be exemplified in the structure to be hereinafter described, and the scope of the application of which will be indicated in the following claims.

In the accompanying drawings, in which is shown one of various possible embodiments of the mechanical features of this invention—

Fig. 2 is a diagrammatic view of the various mechanisms of the machine, showing the piping diagram and the electrical diagram for automatically controlling the grinding cycle;

Figure 1:
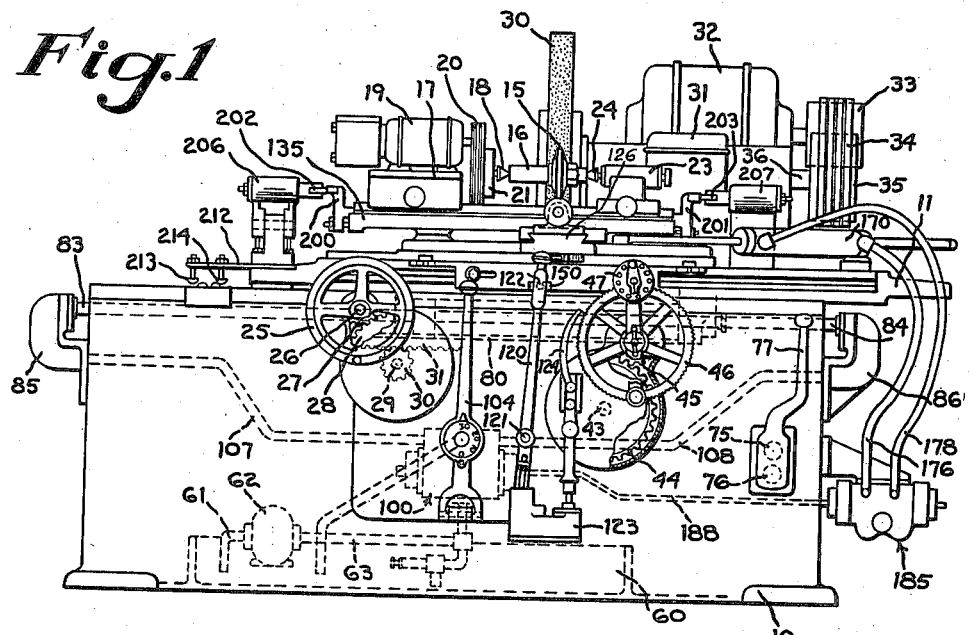
Fig. 1 is a front elevation of the improved grinding machine.
Figure 3:
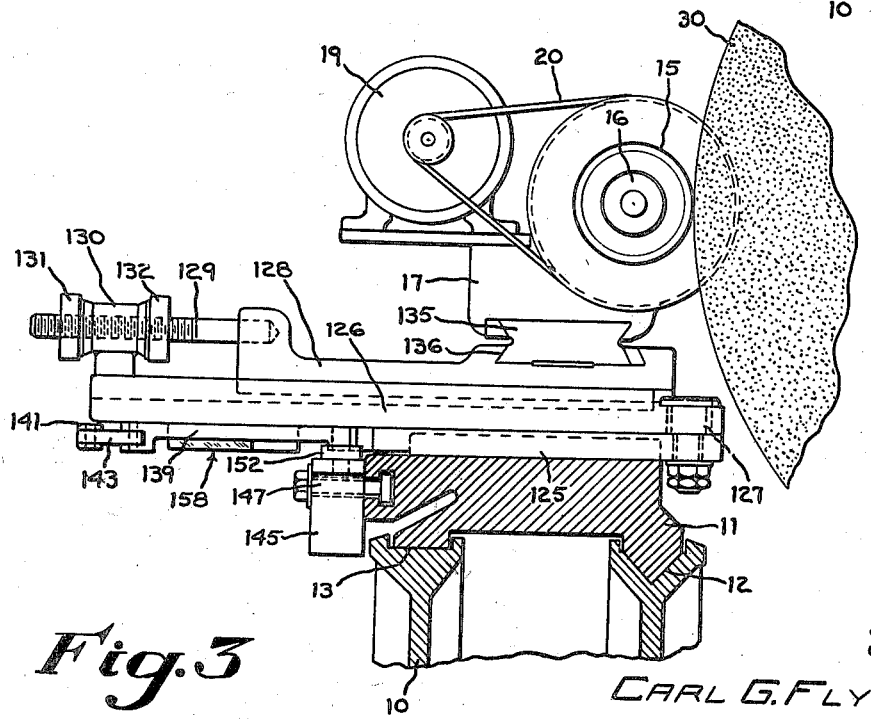
Fig. 3 is a fragmentary sectional view, on an enlarged scale, taken approximately on the line 3—3 of Fig. 2.

The improved grinding machine has been illustrated in the drawings, comprising a base 10 which supports a longitudinally reciprocable work supporting table 11 on the usual V-way 12 and flat way 13 (Fig. 3). The table 11 serves as a rotatable support for a work piece, such as a piston ring 15 which is mounted on a supporting arbor 16. A rotatable work support is provided, comprising a headstock 17 having a headstock center 18 to support the left-hand end of the arbor 16 (Figs. 1 and 2). The headstock 17 is preferably a motor driven headstock in which an electric motor 19 is mounted on the upper surface of the headstock 17. The motor is connected by means of a multiple V-belt drive 20 with a headstock spindle 21.

The right-hand end of the work supporting arbor 16 is supported by means of a footstock 23 having a work supporting center 24 mounted therein which is arranged to engage and rotatably support the footstock end of the arbor 16.

The table 11 is arranged so that it may be traversed longitudinally, either manually or by power. A manually operable traverse mechanism may comprise a manually operable rotatable hand wheel 25 which is rotatably supported on a shaft 26. A gear 27 is also carried by the shaft 26 and is arranged to rotate with the hand wheel 25. The gear 27 meshes with a large gear 28 which is supported on a shaft 29 rotatably mounted in the base 10 of the machine. The shaft 29 also supports a gear 30 which is preferably formed integral with or fixedly mounted to turn with the gear 28. The gear 30 meshes with a rack bar 31 depending from the under side of the table 11. By rotation of the hand wheel 25 in either direction, a corresponding traversing movement may be imparted to the table 11. The power operated mechanism for traversing the work supporting table 11 longitudinally and automatically will be hereinafter described.

A transversely movable rotatable grinding wheel 30 is rotatably supported on a transversely movable wheel slide 31 which is in turn supported on the usual V and flat ways (not shown) formed on the upper surface of the base 10 and is arranged for a transverse feeding movement whereby the grinding wheel 30 may be fed transversely toward or from the work piece 15 as desired. The wheel 30 is preferably driven by means of an electric motor 32 mounted on the upper surface of the wheel slide 31. The motor is provided with a multiple V-groove driving pulley 33 which is connected by multiple V-belts 34 with a multi-groove pulley 35 mounted on the outer end of a wheel spindle 36 which supports the grinding wheel 30 at its other end.

Wheel feed mechanism

A wheel feeding mechanism is provided for feeding the grinding wheel either manually or by power toward and from the work. The wheel feeding mechanism is substantially identical with that shown in the prior U. S. patent to H. A. Silven No. 2,023,704 dated December 10, 1935. A half nut 40 (shown diagrammatically in Fig. 2 as mounted on the side of the slide 31) is mounted on the under side of the wheel slide 31 and meshes with or engages a rotatable cross feed screw 41. The feed screw 41 is rotatably supported in bearings (not shown) in the base 10. A forwardly extending projection 42 of the feed screw 41 is slidably keyed within an aperture (not shown) in the end of a rotatable shaft 43 which projects from the front of the machine base. The shaft 43 is rotatably mounted in bearings (not shown) within the base 10. The shaft 43 is provided at its outer end with a gear 44 which meshes with a gear 45. The gear 45 is mounted to rotate with a manually operable rotatable feed wheel 46. The feed wheel 46 is provided with a micrometer feed adjusting mechanism 47 which is substantially identical with that shown in the above-mentioned prior U. S. patent. The micrometer adjustment serves precisely to adjust a stop abutment relative to the manually operable feed wheel 46 to compensate for grinding wheel wear.

In the preferred construction the wheel slide 31 is arranged so that it may be moved toward and from the work piece 15 to grind the same to a predetermined size by means of a fluid pressure actuated feeding mechanism. As illustrated in the drawings, the rear end of the feed screw 41 is supported in a slidably keyed bearing member 48 which is slidably supported within a casing 49 on the base 10 of the machine. A fluid pressure cylinder 50 is attached to or formed integral with the casing 49 and contains a slidably mounted piston 51 which is connected by means of a piston rod 52 with the bearing member 48 and is arranged so that when fluid under pressure is admitted to a cylinder chamber 53, the piston 51 will be moved upwardly into its rearward or inoperative position, transmitting a corresponding movement through the feed screw 41, the half nut 40, to move the wheel slide 31 and the grinding wheel 30 rearwardly to an inoperative position. Similarly, when fluid under pressure is admitted to a cylinder chamber 59, a rapid approaching movement of the grinding wheel 30 (in a downward direction, Fig. 2) is provided.

A fluid pressure system is provided to supply fluid under pressure for moving the piston 51 so as to cause either an infeeding or outfeeding movement of the grinding wheel. This system may comprise a reservoir 60 which is formed as a box-like section within the base 10. Fluid is drawn from the reservoir 60 through a pipe 61 by means of a motor driven fluid pressure pump 62. The pump 62 forces fluid under pressure through a pipe 63 to a wheel feed control valve 64. The control valve 64 is preferably a piston type valve, comprising a valve stem 65 having formed integrally therewith valve pistons 66 and 67. Fluid under pressure passing through the pipe 63 enters a valve chamber located between the valve pistons 66 and 67 and passes through a passage 68 into the cylinder chamber 53 to move the piston 51 to its rearward position with the grinding wheel 30 separated from the work piece 15, as indicated in the drawings. During the rearward movement of the piston 51 fluid is exhausted from the cylinder chamber 59 through a passage 69 into a valve chamber located between the valve piston 67 and the end of the valve casing, and out through a pipe 70 which exhausts fluid into the reservoir 60. The valve stem 65 is arranged so that it may be moved endwise to shift the valve 64 into a reverse position so as to cause either a forward or rearward feeding movement of the grinding wheel 30.

A spring 71 is provided to maintain the valve 64 normally in its uppermost position (Fig. 2). An electric solenoid 72 is mounted within the base 10 and is operatively connected to shift the valve 64 downwardly (Fig. 2) against the compression of the spring 71. If desired, a fluid pressure controlled feed regulating mechanism having a positive stop may be provided for reducing the rapid approaching movement caused by the pistons 50 to a slow grinding feed. This mechanism is not considered to be a part of the present invention and consequently has not been illustrated in detail. For details of disclosure as to the dash pot feed regulator, reference may be had to the above-mentioned U. S. patent to Silven No. 2,023,704, above referred to.

The feeding mechanism is preferably electrically controlled. A pair of push buttons 75 and 76 are mounted on the front of the machine base and are arranged to be actuated by means of a pivotally mounted control lever 77 (Fig. 1). The push buttons 75 and 76 are connected with power lines and are connected to control an adjustable electrical time delay relay 78. When the lever 77 is actuated to initiate a forward feeding movement of the grinding wheel, the time delay relay 78 is set in motion and also the solenoid 72 is energized to shift the feed control valve 64 into a forward feeding position, such as that shown in Fig. 2. The time delay relay 78 is set to cover the over-all grinding cycle and to deenergize the solenoid 72 after a predetermined time interval has elapsed to release the compression of the spring 71 to reverse the movement of the grinding wheel 30 and thereby shift the grinding wheel rearwardly to an inoperative position.

Work table reciprocation

A fluid pressure mechanism is provided to reciprocate or traverse the table 11 longitudinally so as to grind the cylindrical surface on the work piece 15 and also to position the work piece for grinding a radius or fillet adjacent to the ends of the cylindrical surface. A fluid pressure cylinder 80 is fixedly mounted on the under side of the table 11. The cylinder 80 contains a pair of spaced pistons 81 and 82 which are connected by a pair of hollow piston rods 83 and 84, respectively, with a pair of hollow brackets 85 and 86, respectively, which are fixedly mounted on opposite ends of the base 10. The table traversing or reciprocating mechanism utilized in the present disclosure is identical with that shown in the prior U. S. patent to W. H. Wood No. 2,071,677 dated February 23, 1937, to which reference may be had for details of disclosure not contained herein. Fluid under pressure from the pump 62 within the base 10 of the machine forces fluid through the pipe 63 and through a pipe 87 and a valve 88 which is actuated by means of a solenoid 89 and through a pipe 90 to a directional control valve 91. The directional valve serves to admit fluid under pressure either to the table traverse cylinder 80 above referred to or to another fluid pressure system for swivelling the work support to be hereinafter described.

The directional valve 91 is a piston type valve comprising a valve stem 92 having formed integrally therewith valve pistons 93 and 94. A spring 95 serves normally to hold the valve stem 92 in an upward direction (Fig. 2), that is, in a position for traversing the work supporting table 11. A solenoid 96 is connected to the other end of the valve stem 92 and serves when energized to shift the valve stem 92 downwardly (Fig. 2) to cut off fluid flow to the table traverse mechanism and to admit fluid under pressure to the work supporting swivelling system to be hereinafter described. In the position of the directional valve (Fig. 2) fluid under pressure passing through the pipe 90 enters a valve chamber located between the valve pistons 93 and 94 and passes out through a pipe 97, a throttle valve 98, and a pipe 99 to a table control valve unit 100. The valve 98 serves to regulate the flow of fluid through the pipe 99 as desired.

The valve unit 100, as shown diagrammatically in Fig. 2, comprises a stop and start valve 101 and also a reversing valve 106 whereby the direction of flow of fluid to the table cylinder may be automatically controlled. The valve 101 serves as a stop and start valve as well as a speed control valve for the table traversing movement. When the valve stem is rotated by means of a knob 102, a V-port to be hereinafter described serves to regulate the flow of fluid. The valve piston 103 is also arranged for a longitudinal sliding movement by means of a manually operable control lever 104 (Figs. 1 and 2) which is pivotally mounted by means of a stud 105 on the front of the machine base. When the lever 104 is moved in a clockwise direction the valve 103 will be closed, thus stopping the traversing movement of the table when desired. The valve unit 100 also contains a reversing valve 106 which is arranged to convey fluid either through a pipe 107 to a cylinder chamber 108 or through a pipe 109 into a cylinder chamber 110 to control the direction of movement of the table 11.

Figure 5:
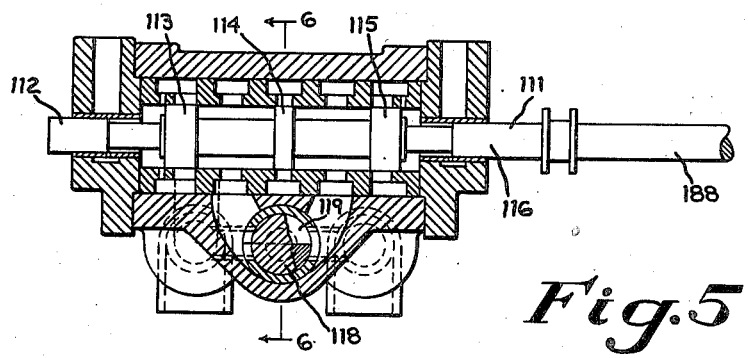
Fig. 5 is a vertical sectional view through the table reversing valve, on an enlarged scale.
Figure 6:
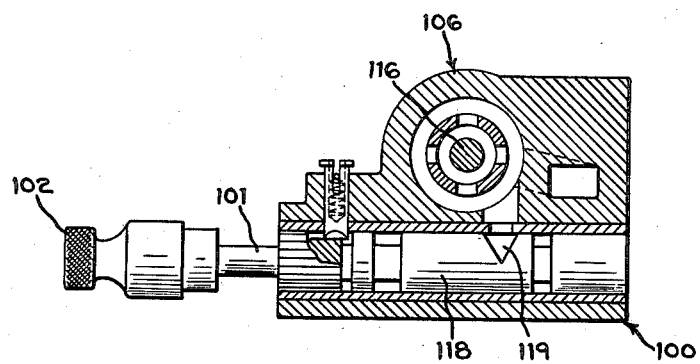
Fig. 6 is a fragmentary cross-sectional view, taken approximately on the line 6—6 of Fig. 5, through the table reversing valve, showing the construction of the speed control valve associated therewith.

The constructional details of the valve mechanism 100 have been illustrated in Figs. 5 and 6. The reversing valve (Fig. 5) comprises a valve stem 111 having formed integrally therewith valve pistons 112, 113, 114, 115 and 116. The valve stem 101 is provided with a valve piston 118 having a V-groove 119 formed therein. In the position illustrated in Fig. 6 the V-port allows full exhaust of fluid from the cylinder chamber. When the knob 102 is rotated the V-port cuts off more or less of the port aperture and thus controls and regulates the longitudinal movement of the table 11. A detailed description of this valve mechanism and its operation is not deemed necessary in the present case since this mechanism and the operation thereof are fully disclosed in the prior patent to Wood No. 2,071,677 to which reference may be had for details of disclosure not contained herein.

The reversing valve is preferably actuated by means of a pivotally mounted reversing lever 120 which is pivotally supported on a stud 121 on the front of the machine base. The upper end of the reversing lever 120 is provided with a stud 122 which is arranged to be actuated automatically in a manner to be hereinafter described by movement of the work support.

A pawl and ratchet infeeding mechanism is provided for the grinding wheel 15, which comprises a fluid pressure piston and cylinder mechanism contained within a casing 123 which serves to reciprocate a feed pawl 124 to incrementally rotate the feed wheel 46. This mechanism has not been illustrated in detail in the present case, since it is not considered to be a part of the present invention and is identical with that shown in the above-mentioned prior patent to Wood No. 2,071,677 to which reference may be had for details of disclosure not contained herein. Each time the reversing lever 120 is shifted to reverse the valves 106 and 107, the hydraulic feed mechanism contained within the casing 123 actuates the pawl 124 to advance the wheel 30 into the work piece.

In order to attain the main object of the invention, the work piece 15 is held in position with its axis substantially parallel to the axis of the grinding wheel 30 to produce a true cylindrical surface on the periphery of the work piece 15. In order to grind a radius or fillet at one or both ends of the cylindrical face, the work supporting member is preferably pivotally mounted so that the axis of the work piece may be swung about an axis which is normal to a plane passing through the axes of the grinding wheel and work piece to produce the desired curved face on the periphery of the work piece. A platen 125 is fixedly mounted on the upper surface of the table 11. The platen 125 serves as a support for a pivotally mounted frame 126 which is supported by means of a vertically arranged pivot stud 127 and is arranged to swing in a horizontal plane to shift the axis of the work piece 15 relative to the axis of the grinding wheel 30 when desired. The frame 126 serves as a support for a transversely movable slide 128. An adjusting means is provided for the slide 128 comprising a screw 129 which has one end fixedly mounted to the slide 128. The screw 129 passes through an aperture within a boss 130 projecting upwardly from the frame 126. A pair of nuts 131 and 132 are screw threaded onto the screw 129 on opposite sides of the boss 130 and serve as push and pull nuts to adjust the position of the transverse slide 128 as desired. This adjustment is particularly adapted for providing a transverse adjustment of the work support in setting up the machine for grinding work pieces of a given diameter.

In order to grind a fillet of the desired radius, it is necessary to position the pivot stud 127 so that the pivotal axis of the work support coincides with the center of the corner radius which it is desired to produce on the work piece. As above stated, in the preferred form it is desirable to adapt the mechanism for grinding a fillet adjacent one or both ends of the cylindrical face on the work piece 15. It is, therefore, necessary first to shift the work piece 15 so that the center of one fillet coincides with the axis of the pivot 127 and while in this position to grind one of the fillets on the work piece 15. It is then necessary to shift the work piece 15 longitudinally to bring the center of the other fillet into alignment with the axis of the pivot 127 before grinding the second fillet on the work piece. In order to facilitate this movement, a longitudinally movable shuttle table 135 is supported in a dovetailed way 136 formed on the upper face of the transverse slide 123. The upper portion of the shuttle table 135 is similarly formed as a dovetailed way for supporting the headstock 17 and the footstock 25.

Figure 4:
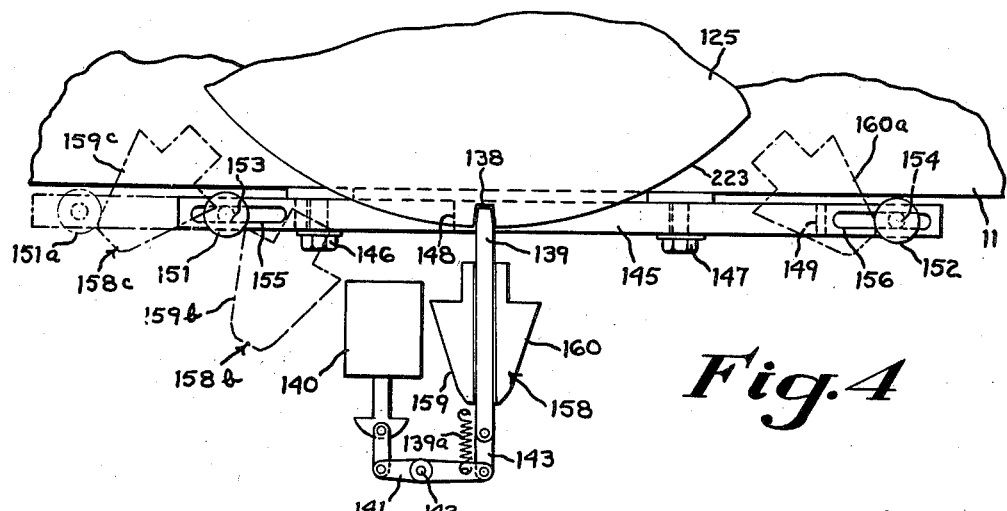
Fig. 4 is a fragmentary plan view of the mechanism for actuating the table reversing mechanism in timed relation with the swivelling of the work support.

The plate 125 which is fastened to the upper surface of the table 11 is provided with a notch 138 which is arranged to be engaged by a slidably mounted locking plunger 139 (Fig. 4) which is carried by the pivotally mounted frame 126. The plunger 139 is normally held in a latched position in engagement with the notch 138 by means of a spring 139a. A solenoid 140 is operatively connected through a pivotally mounted rock arm 141 pivoted on a stud 142 and connected at its other end by means of a link 143 automatically to withdraw the plunger 139 to allow the frame 126 to swing to shift the axis of the rotatable work piece relative to the axis of the grinding wheel during the grinding operation to grind a radius or fillet adjacent to the cylindrical face thereon.

In order to shift the reversing valve at the ends of the work stroke, that is, when a fillet has been ground at one end of a work piece, a slidably mounted bar 145 is supported on the front edge of the table 11 by means of studs 146 and 147 which pass through elongated slots 148 and 149 formed in the bar 145. The bar 145 is provided with a notch 150 in its under surface which engages the stud 122 projecting from the reversing lever 120. A clearance is provided in the notch 150 so that the bar 145 may be moved longitudinally through a short distance before its motion is transmitted to rock the reversing lever 120.

The bar 145 is provided with adjustably positioned actuating rollers 151 and 152 which are supported by studs 153 and 154, respectively. The studs 153 and 154 are adjustable longitudinally relative to the bar 145 within elongated slots 155 and 156 formed in the end portions of the bar 145.

The under surface of the pivotally mounted frame 126 is provided with an arrowhead-shaped member 158 having cam faces 159 and 160 formed thereon. When the frame 126 is swung in a counterclockwise direction (Fig. 4), the cam face 160 moves into position 160a. During this movement the cam face 160a engages the roller 152 and slides the roller 152 and the bar 145 longitudinally toward the right (Figs. 1 and 4) to shift the reversing lever 120 into the position illustrated in Fig. 1. During this movement the axis of the work piece is swung relative to the axis of the grinding wheel to generate a radius or fillet adjacent to the right-hand end of the cylindrical face on the work piece 15. The frame 126 is then swung in a clockwise direction so that the cylindrical face is again swung into operative engagement with the periphery of the grinding wheel. The shuttle table 135 is moved longitudinally toward the right to shift the work piece so that the center of the fillet or radius to be formed at the left-hand end of the cylindrical face on the work piece 15 is aligned with the axis of the pivot stud 127. The plunger 139 is then again automatically withdrawn from the notch 138 by energizing the solenoid 140. The frame 126 is then swung in a clockwise direction so that the arrowhead 158 assumes the position 158b and the cam face 159 moves into position 159b in engagement with the roller 151. Continued movement of the frame 126 in its movement in a clockwise direction (Fig. 4) shifts the arrow-shaped member 158 into position 158c and the cam face 159 into position 159c, thus shifting the roller 151 into broken line position 151a which shifts the bar 145 longitudinally toward the left (Figs. 1 and 4), which movement serves to shift the notch 150 so that it engages the stud 122 and rocks the reversing lever 120 in a counterclockwise direction (Fig. 1), which movement serves to shift the valve stem 111 toward the right (Fig. 5) to shift the reversing valve into the reverse position and thus start the movement of the table in the reverse direction.

A fluid pressure mechanism is provided for swinging the frame 126 in timed relation with the other mechanisms of the machine. This mechanism comprises a fluid pressure cylinder 170 which is pivotally mounted by means of a stud 171 on a bracket 172 which is fixedly mounted at the right-hand end of the table 11. The cylinder 170 contains a slidably mounted piston 173 and is connected by means of a piston rod 174 with a stud 175 which is fixedly supported relative to the swinging frame 126. When fluid under pressure is admitted through a pipe 176 into a cylinder chamber 177, the piston 173 and rod 174 will be moved toward the right (Fig. 2) to swing the frame 126 in a counterclockwise direction to grind a fillet at the right-hand end of the cylindrical portion on the work piece 15.

Similarly, when fluid under pressure is forced through a pipe 178 into a cylinder chamber 179, the piston 173, piston rod 174 and stud 175 are moved toward the left (Fig. 2) to swing the frame 126 in a clockwise direction to grind a fillet adjacent to the left-hand end of the work piece 15. Valves 180 and 181 are provided in the pipe lines 176 and 178, respectively, to facilitate adjustment of the flow of fluid under pressure therethrough so that the speed of movement of the piston 173 and the swinging frame 126 may be readily controlled. A suitable control valve unit 185 is provided for controlling the admission to and exhaust of fluid from the cylinder 170. The control valve unit 185 is identical with the table control valve 109, consequently this valve is only shown diagrammatically in Fig. 2. The valve unit 185 includes a stop and start valve 186 whereby the cylinder 170 may be cut off from the main fluid pressure system, if desired, by moving the valve stem 186 longitudinally. The valve stem 186 serves also as a speed control valve, whereby the fluid passing therethrough may be throttled to govern the speed of movement of the frame 126 during its swinging movement. The control valve unit 185 also includes a reversing valve 187 whereby the fluid passing to and from the cylinder 170 through the pipes 176 and 178, respectively, may be reversed as desired.

It is desirable that the movement of the table 11 and the swivelling movement of the frame 126 be synchronized so that one of said members is inoperative while the other is operative and vice versa. In order to obtain this synchronization, the valve stem 111 is operatively connected by means of a rod 188 to actuate the reversing valve 187 in timed relation with the table reversing valve 106 so that when the bar 145 carried by the table is shifted longitudinally at the ends of the oscillatory stroke of the frame 126 in either direction, the table reversing valve 106 and also the swivel reversing valve 187 are automatically shifted into their reverse positions.

The directional control valve 91 is provided with a pipe 189 which is connected by means of a valve 190 with a pipe 191 to convey fluid under pressure to the swivel control valve unit 185. When the directional valve is positioned as shown in Fig. 2, with the valve pistons 93 and 94 in an upward position, fluid is cut off from the pipe 189 and directed only through the pipe 97, valve 98 and pipe 99 to the table control valve unit 100.

The directional control valve 185 is operated in timed relation with the other units of the machine, so that when the solenoid 96 is automatically energized in timed relation with the other mechanisms of the machine the directional control valve 91 is moved downwardly (Fig. 2) to cut off fluid from the table control valve unit 100 and to pass fluid under pressure through the pipe 189, the valve 190, and the pipe 191 to the swivel control valve unit 85 to admit fluid under pressure to one end or the other of the cylinder 170 to initiate a swivelling movement of the frame 126 so as to grind a radius or fillet adjacent to one end of the cylindrical face on the work piece.

The shuttle table 135 is moved relative to the table 11 during the traversing movement of the latter. A pair of brackets 200 and 201, respectively, are fastened to opposite ends of the shuttle table 135. The brackets 200 and 201 are provided with cam faces which are arranged to be engaged by rollers 202 and 203, respectively. The rollers 202 and 203 are supported by plungers 204 and 205, respectively, which are in turn supported by brackets 206 and 207, respectively. The brackets 206 and 207 are pivotally mounted on supporting plates 208 and 209 which are fixedly secured to the base 10. As the table 11 is traversed longitudinally under the influence of fluid under pressure, the shuttle table 135 travels with the table 11 until the cam face on the bracket 200 or 201 engages the rollers 202 or 203, respectively, which serves to hold the shuttle table together with the headstock and footstock and the work piece being ground stationary during the completion of the reciprocatory traverse of the table 11. The plungers 204 and 205 are preferably adjustably mounted so that the shuttle table will be accurately positioned at each end of its stroke so that the centers of the fillets to be produced adjacent to one or each end of the cylindrical face on the work piece are successively aligned with the axis of the pivotal stud 127.

It is desirable to provide a suitable interlock between the movement of the table 11, the movement of the shuttle table 135, and the energizing of the solenoid 140 to withdraw the locating plunger 139. As illustrated in the drawings, a pair of normally open limit switches 210 and 211 are mounted on the base 10 of the machine. The table 11 is provided with a bracket 212 projecting from its left-hand end which carries a pair of adjustably mounted actuating members 213 and 214 which are arranged to actuate either the limit switch 210 or 211 as the table 11 is moved longitudinally.

Similarly, a pair of normally open limit switches 215 and 216 are mounted on the table 11 and are arranged to be actuated by adjustable screws 217 and 218 which are adjustably mounted on the front edge of the shuttle table 135. The limit switches 210 and 211 are connected in series with the limit switches 215 and 216, respectively, and these limit switches are in turn connected to set in motion an electrical time delay relay 220 which serves to energize the solenoid 140 which serves to withdraw the locking plunger 139. Withdrawal of the plunger 139 serves to close a normally open limit switch 221 which closes a circuit to energize the solenoid 96 which shifts the directional control valve 91 to admit fluid under pressure to the swivel control valve unit 185 which in turn admits fluid under pressure to one end or the other of the cylinder 170 to swivel the axis of the work piece relative to the axis of the grinding wheel about the axis of the pivotal stud 127 so as to generate a fillet on the periphery of the work piece 15 adjacent to the end of the cylindrical face produced thereon.

The time relay 220 is adjusted so that the solenoid 140 will be energized a sufficient length of time for the frame 226 to start its pivotal motion, after which the time relay 220 operates to deenergize the solenoid 140, thus allowing the locking plunger 139 to ride on the periphery of the arcuate surface 223 of the supporting plate 125 so that upon the return stroke the locking plunger 139 under the influence of an actuating spring 139a will return into engagement with the notch 138 formed in the plate 125. It will be readily apparent from the foregoing disclosure that the solenoid 140 cannot be energized until the table 11 has been shifted to close either the limit switch 210 or 211, after which it is necessary for the shuttle table to move relative to the table 11 to close either the limit switch 215 or 216 before the relay 220 can be set in motion to energize the solenoid 140 and start the pivotal movement. It is further readily apparent that the solenoid 96 cannot be energized to shift the directional control valve 91 so as to admit fluid under pressure to the pivotal cylinder 170 until after the solenoid 140 has been energized to withdraw the locking plunger 139, thereby closing the limit switch 221.

The operation of this machine is readily apparent from the foregoing disclosure. Assuming the parts to have been previously adjusted and the machine set up for grinding a given size piston ring or work piece 15, the machine is started by moving the control lever 77 to close the circuit which sets in motion the time relay 78 and energizes the solenoid 72 to initiate a forward feeding movement of the grinding wheel 30. When the wheel slide starts its forward feeding movement toward the work, the abutment or cam 230 recedes from the normally closed limit switch 231 which closes a circuit to actuate a magnetic starter switch 232 which in turn starts the work driving motor 19 and energizes the solenoid 89 to open the pressure valve 88 so as to admit fluid under pressure to the directional control valve 91. The spring 95 normally holds the directional valve 91 in an uppermost position (Fig. 2) so that when the valve 88 is opened fluid under pressure passes through the directional valve 91 and out through the pipe 99 and through the table control valve 100 and through a pipe 109 into cylinder chamber 110 to move the cylinder 80 and the table 11 attached thereto toward the right. As the table moves toward the right, the cam face on the bracket 201 carried by the shuttle table 135 engages the roller 203 carried by the bracket 207 and thus stops the longitudinal movement of the shuttle table 135 together with the headstock 17 and footstock 23 and also the work piece 15 with the right-hand corner radius center of the piston ring being ground directly over the axis of the pivotal stud 127.

At the same time, the adjustably positioned screw 213 carried by the shuttle table 135 closes the limit switch 216 and the main table dog or actuating member 214 actuates the normally open limit switch 211 which serves to set in motion the "Microflex" time relay 220 and also to energize the solenoid 140 which in turn retracts the locking plunger 139 from its notch 138 in the swivel plate 125. At the same time, the directional control valve 91 is moved downwardly by energizing the solenoid 96. This movement of the valve 91 serves to cut off fluid from the pipe 99, thus stopping the movement of the table 11, and passes fluid under pressure through the pipe 191 to the swivel control valve unit 185 which conveys fluid under pressure through the pipe 176 into the cylinder chamber 177 in the cylinder 170 to move the piston 173 toward the right (Fig. 2) to grind the right-hand corner radius on the piston ring. The swivel frame 126 moves approximately through a 45° motion until the cam 160 on the arrow-pointed plate 158 engages the roller 152 and shifts the bar 145 toward the right which in turn shifts the reversing valve by moving the reversing lever 120 into the position illustrated in Fig. 1. This movement shifts the rod 108 so as to change the position of the reversing valve 187 to reverse the flow of fluid under pressure to the cylinder 170, thus starting the swivelling of the work piece in the reverse direction.

When the reversing lever 120 is shifted in either direction to reverse the valves 106 and 187, a hydraulically operated pawl and ratchet feed mechanism advances the wheel into the work for the return stroke. The time relay 220 which has energized the solenoid 140 is set to deenergize the solenoid 140 before the locking plunger 139 again reaches the notch 138 in the plate 125 so that the end of the plunger 139 rides on the peripheral arcuate surface 223 of the plate 125. When the plunger 139 moves into alignment with the notch 138 and drops therein, this movement serves to open the normally open limit switch 221 which in turn serves to deenergize the solenoid 96, allowing the directional control valve 91 to move upwardly, thus cutting off fluid under pressure from the pipe 191 and again admitting fluid under pressure through the pipe 99 to the table control valve unit 109. The reversing valve 106, being interconnected with the reversing valve 187, has previously been shifted into its reverse position so that the fluid under pressure passing therethrough is conveyed through the pipe 107 into the cylinder chamber 108 to move the cylinder 80 and the table 11 toward the left (Figs. 1 and 2).

The movement of the table 11 toward the left continues until the cam face of the bracket 200 engages the roller 202 which serves to hold the shuttle table 135 stationary during the remaining movement of the table 11 toward the left. The roller 202 and bracket 200 serve to locate the left-hand corner radius center of the piston ring being ground directly over the axis of the pivot stud 127. At the same time, the shuttle table adjusting screw 217 closes the limit switch 215 and the main table dog 213 carried by the table 11 closes the limit switch 210 which serves to again set the "Microflex" time delay relay 220 in motion and to energize the solenoid 140 to again withdraw the locking plunger 139. The withdrawal of the locking plunger 139 from the notch 138 serves to close the normally open limit switch 221 which makes a circuit to energize the solenoid 96 which again moves the directional control valve downwardly to cut off fluid pressure from the pipe 99 to stop the movement of the table 11 and at the same time to admit fluid under pressure through the pipe 191 to the swivel control valve unit 185 which admits fluid under pressure to the cylinder chamber 179 to produce a movement of the piston 173 and piston rod 174 toward the left (Fig. 2) to swivel the frame 126 in a clockwise direction (Fig. 2) to grind the left-hand corner radius or fillet on the piston ring 15 being ground.

As the frame 126 approaches a 45° position, the cam face 159 moves into position 159b in contact with the roller 151 and continued movement swings the arrowhead member 158 into position 158c, during which movement the cam face 159 moves into position 159c, moving the roller 151 toward the right into broken line position 151a. This movement of the roller 151 produces a corresponding movement of the slide bar 145 toward the right, during which movement the notch 156 in the slide bar 145 engages the stud 122 on the reversing lever 120 and shifts the reversing lever in a counterclockwise direction, which movement shifts the reversing valves 106 and 187 of the control valve units 109 and 185 so as to reverse the flow of fluid to the cylinder 170 and admit fluid under pressure to the cylinder chamber 177 which swings the frame 126 in a counterclockwise direction (Fig. 2) to grind the left-hand corner radius again on its return stroke.

As the frame approaches its normal locked position, the time delay relay 220 operates to deenergize the solenoid 140 so that the end of the locking plunger 139 rides on the peripheral arcuate surface 223 of the plate 125. When the plunger 139 moves into alignment with the notch 138, the released compression of a spring throws the locking plunger 139 into engagement with the notch 138, thus locking the frame 126 in position, with the work axis parallel to the wheel axis. During this locking movement the limit switch 221 opens, thus deenergizing the solenoid 96, at which time the electrical time delay relay 78 operates to deenergize the solenoid 72, releasing the compression of the spring 71 which returns the speed control valve 64 to its reverse position to initiate a rearward feeding movement of the grinding wheel slide 31 to remove the wheel 30 to an inoperative position. When the wheel slide reaches its rearmost position a detent on the slide 31 engages and opens the normally closed limit switch 231 which in turn opens a circuit to cut off the magnetic starter switch. The actuation of the magnetic starter switch serves to stop the work drive motor to facilitate removal of the ground work piece and the insertion of a new work piece there instead.

A limit switch 235 which is a normally open limit switch is arranged to be actuated in timed relation with the solenoid 140 in a manner similar to the switch 221. The limit switch 235 is connected in parallel with the limit switch 231 and serves to insure the swivel plate 126 returning to its neutral position when the table stops for a loading operation. The cycle of operation above described may be repeated one or more times on a given work piece if desired, depending upon the setting of the time relay 78. In case one or more cycles are utilized, the limit switch 235 serves to maintain the circuit to the magnetic starter switch closed until the swivel plate 126 has returned into a latched position with the plunger 139 in engagement with the notch 138 to complete the cycle of movement of the parts.

It will thus be seen that there has been provided by this invention apparatus in which the various objects hereinabove set forth together with many thoroughly practical advantages are successfully achieved. As many possible embodiments may be made of the above invention and as many changes might be made in the embodiment above set forth, it is to be understood that all matter hereinbefore set forth or shown in the accompanying drawings is to be interpreted as illustrative and not in a limiting sense.

I claim:

1. In a grinding machine having a transversely movable rotatable grinding wheel, a longitudinally movable table, a pivotally mounted horizontally movable platen carried thereby, a rotatable work support on said platen, means to feed said wheel transversely toward and from said work support to produce a predetermined grinding feed, means to reciprocate said work table longitudinally to grind a cylindrical face on a work piece, means to swing said platen relative to said table during rotation of the work piece to produce a predetermined radius adjacent to the end of said cylindrical surface, and an interlocking mechanism between said table reciprocating mechanism and said swinging mechanism whereby one of said mechanisms is rendered inoperative while the other is in an operating position.

2. In a grinding machine having a transversely movable rotatable grinding wheel, a longitudinally reciprocable work table, a pivotally mounted horizontally movable platen carried thereby, a transversely adjustable slide on said platen, a longitudinally movable slide carried by said transverse slide, a rotatable work support including a headstock and a footstock on said longitudinally movable slide, means including a piston and cylinder to reciprocate said work table to grind a cylindrical face on a work piece, and means including a piston and cylinder operatively connected to swing said supporting platen during rotation of the work piece to produce a predetermined radius adjacent to said cylindrical face.

3. In a grinding machine having a rotatable grinding wheel and a rotatable work support which are movable longitudinally and transversely relative to each other, means including a piston and cylinder to cause a relative transverse feeding movement between said members, means including a piston and cylinder to cause a relative longitudinal traversing movement between said members, means including a piston and cylinder to swing one of said members about an axis which is normal to a plane passing through the axes of said members to grind a predetermined radius on the periphery of a work piece, and means including a directional control valve which is automatically actuated and is arranged to admit fluid under pressure either to the traverse cylinder or to the swivel cylinder.

4. In a grinding machine having a rotatable grinding wheel and a rotatable work support which are movable longitudinally and transversely relative to each other, means normally to lock said wheel and work support with their axes parallel to each other, means to traverse said wheel and work support longitudinally relative to each other, means to cause a relative swinging movement between said wheel and work support about an axis normal to a plane passing through the axes of the wheel and work, electrically operated means to actuate said locking means, and electrically operated mechanism actuated by and in timed relation with said relative longitudinal movement to actuate said locking means to initiate a relative swinging movement between the wheel and work support to grind a curved face on the periphery of a work piece.

5. In a grinding machine having a transversely movable rotatable grinding wheel, a longitudinally reciprocable work table, a rotatable work support pivotally supported on said table which is arranged to swing about an axis normal to a plane passing through the axes of the grinding wheel and rotatable work support, means including independent fluid motors to actuate each of said elements, separate reversing valves for each of said motors, a directional control valve to control the admission of fluid under pressure to said table and swinging motors, and means controlled by the transverse movement of said grinding wheel and the longitudinal movement of said table to actuate said control valve to initiate a swinging movement of the rotatable work support to grind a radius on the periphery of a work piece.

6. In a grinding machine having a transversely movable rotatable grinding wheel, a longitudinally reciprocable work table, a rotatable work support pivotally supported on said table which is arranged to swing about an axis normal to a plane passing through the axes of the grinding wheel and rotatable work support, means including independent fluid motors to actuate each of said elements, separate reversing valves for each of said motors, a directional control valve to control the admission of fluid under pressure to said table and swinging motors, and an electrical interlock and control mechanism actuated by the transverse movement of the grinding wheel and the longitudinal movement of said table to actuate said control valve to stop the table and to initiate a swinging movement of said work support.

7. In a grinding machine having a rotatable grinding wheel and a rotatable work support which are movable longitudinally and transversely relative to each other, a locking plunger normally to hold said wheel and work support with their axes parallel to each other, means including a solenoid to withdraw said plunger, means relatively to traverse said wheel and work support longitudinally relative to each other, means to cause a relative swinging movement between said wheel and work support about an axis normal to a plane passing through the axes of the wheel and work support, and an electrical interlock actuated by and in timed relation with said longitudinal traversing movement to energize said solenoid to withdraw said locking plunger when the longitudinal traversing movement has completed its effective stroke.

8. In a grinding machine having a rotatable grinding wheel and a rotatable work support which are movable longitudinally and transversely relative to each other, means including a locking plunger normally to hold said wheel and work support with their axes parallel to each other, a feeding mechanism to cause a relative feeding movement between the wheel and work support to grind a cylindrical face on a work piece, a reciprocating mechanism to produce a relative longitudinal movement between the wheel and work support, means to cause a relative swinging movement between the wheel and work support about an axis normal to a plane passing through the axes of the wheel and work support to grind a radius or fillet on a work piece, an electrically controlled mechanism to produce first a relative longitudinal movement between the wheel and work support and then a relative swinging movement therebetween, and means actuated in timed relation with said swinging movement to reverse the direction of said swinging and longitudinal movement.

9. In a grinding machine having a transversely movable rotatable grinding wheel, a longitudinally reciprocable table, a pivotally mounted platen carried thereby, a transversely adjustable slide on said platen, a longitudinally movable table carried by said transverse slide, a rotatable work support including a headstock and a footstock on said shuttle table, means including a piston and cylinder to reciprocate said work table longitudinally to grind a cylindrical surface on a work piece, means including a piston and cylinder operatively connected to swing said platen during rotation of the work piece to produce a predetermined radius on the work piece adjacent to said cylindrical surface, a directional control valve to admit fluid under pressure either to the table traverse cylinder or to the plate swinging cylinder, and means actuated by and in timed relation with said table to actuate said valve to stop the work table and to initiate a swinging movement of said platen relative to said table.

10. In a grinding machine having a transversely movable rotatable grinding wheel, a longitudinally reciprocable work table, a pivotally mounted platen carried thereby, a transversely adjustable slide on said platen, a longitudinally movable table carried by said transverse slide, a rotatable work support including a headstock and a footstock on said longitudinally movable slide, means normally to lock said plate with the axis of the work support parallel to the axis of the grinding wheel, means including a piston and cylinder to reciprocate said table longitudinally to grind a cylindrical surface on a work piece, means including a piston and cylinder operatively connected to swing said platen during rotation of said work support to produce a predetermined radius on the work piece adjacent to said cylindrical surface, a directional control valve to admit fluid under pressure either to the table traverse cylinder or to the platen swinging cylinder, and means actuated by and in timed relation with said table to unlock said platen and to actuate said control valve to stop said work table and to initiate a swinging movement of the work support relative to said table.

11. In a grinding machine having a transversely movable rotatable grinding wheel, a longitudinally reciprocable work table, a pivotally mounted platen carried thereby, a transversely adjustable slide on said platen, a longitudinally movable slide carried by said transverse slide, a rotatable work support including a headstock and a footstock on said longitudinally movable slide, means normally to lock said platen with the axis of the work support parallel to the axis of the grinding wheel, means including a piston and cylinder to reciprocate said table longitudinally to grind a cylindrical surface on a work piece, means actuated by and in timed relation with the longitudinal movement of the work table to unlock said platen, means including a piston and cylinder operatively connected to swing said platen during rotation of the work piece to produce a predetermined curved face on the work piece adjacent to said cylindrical surface, and means including a directional control valve which is automatically actuated and is arranged to admit fluid either to the table cylinder or to the platen cylinder, whereby said cylindrical face may be ground while the table is traversed and said radius may be ground thereafter by the swinging movement of said supporting platen while the table remains stationary.

12. In a grinding machine having a transversely movable rotatable grinding wheel, a longitudinally reciprocable work table, a pivotally mounted platen carried thereby, a transversely adjustable slide on said platen, a longitudinally movable slide carried by said transverse slide, a rotatable work support including a headstock and a footstock on said longitudinally movable slide, means including a piston and cylinder to reciprocate said table to grind a cylindrical surface on the work piece, means including a piston and cylinder operatively connected to swing said supporting plate during rotation of the work piece to produce a predetermined radius on the work piece adjacent to said cylindrical surface, a table actuated reversing valve to control the flow of fluid under pressure to said table cylinder, and a second reversing valve actuated by and in timed relation with the first valve to control the flow of fluid under pressure to said supporting plate cylinder.

13. In a grinding machine having a transversely movable rotatable grinding wheel, a longitudinally reciprocable work table, a pivotally mounted platen carried thereby, a transversely adjustable slide on said plate, a longitudinally movable slide carried by said transverse slide, a rotatable work support including a headstock and a footstock on said longitudinally movable slide, means including a piston and cylinder to reciprocate said table to grind a cylindrical surface on the work piece, means including a piston and cylinder operatively connected to swing said supporting plate during rotation of the work piece to produce a predetermined radius on the work piece adjacent to said cylindrical surface, a table actuated reversing valve to control the flow of fluid under pressure to said table cylinder, a second reversing valve actuated by and in timed relation with the first valve to control the flow of fluid under pressure to said supporting plate cylinder, and means actuated by the swinging movement of said platen to actuate said reversing valves.

14. In a grinding machine having a transversely movable rotatable grinding wheel, a longitudinally movable table, means to reciprocate said table, a longitudinally movable shuttle table supported on said table, a rotatable work support on said shuttle table, means to cause a swinging movement of said shuttle table relative to said longitudinally movable table about an axis normal to a plane passing through the axes of the wheel and work support to grind a radius or fillet on the work piece, and means to limit the longitudinal movement of said shuttle table to position the work piece with the center of said radius aligned with the pivotal axis.

15. In a grinding machine having a transversely movable rotatable grinding wheel, means to feed said wheel transversely, a longitudinally movable table, a pivotally mounted horizontally movable platen on said table, a rotatable work support on said platen, means to reciprocate said table to grind a cylindrical face on a work piece, means to swing said platen relative to said table during rotation of the work piece to grind a radius on the work piece adjacent to said cylindrical surface, and means to adjust the work support relative to said platen to position the work axis relative to the platen pivot.

CARL G. FLYGARE.